(12) United States Patent
Zhang et al.

(10) Patent No.: US 11,243,537 B2
(45) Date of Patent: Feb. 8, 2022

(54) METHOD, APPARATUS, DEVICE AND STORAGE MEDIUM FOR CONTROLLING AN UNMANNED VEHICLE

(71) Applicant: Baidu Online Network Technology (Beijing) Co., Ltd., Beijing (CN)

(72) Inventors: Lei Zhang, Beijing (CN); Kai Yang, Beijing (CN); Qijuan Yin, Beijing (CN); Xiaoyan Wang, Beijing (CN); Baisheng Wang, Beijing (CN); Zhuo Chen, Beijing (CN)

(73) Assignee: Apollo Intelligent Driving (Beijing) Technology Co., Ltd., Beijing (CN)

( * ) Notice: Subject to any disclaimer, the term of this patent is extended or adjusted under 35 U.S.C. 154(b) by 180 days.

(21) Appl. No.: 16/505,817

(22) Filed: Jul. 9, 2019

(65) Prior Publication Data

US 2020/0073391 A1 Mar. 5, 2020

(30) Foreign Application Priority Data

Aug. 30, 2018 (CN) .......................... 201811005091.2

(51) Int. Cl.
  *G05D 1/02* (2020.01)
  *H01Q 1/27* (2006.01)
  *G05D 1/00* (2006.01)

(52) U.S. Cl.
  CPC .................. *G05D 1/02* (2013.01); *H01Q 1/27* (2013.01); *G05D 1/0027* (2013.01)

(58) Field of Classification Search
  CPC .................. G05D 1/02; G05D 1/0027; G05D 2201/0213; G05D 1/0077; H01Q 1/27;
  (Continued)

(56) References Cited

U.S. PATENT DOCUMENTS 6,957,128 B1 * 10/2005 Ito ........................ G08G 1/0962
  340/425.5
8,848,708 B2 9/2014 Huang et al.
  (Continued)

FOREIGN PATENT DOCUMENTS

CN 101741742 A 6/2010
CN 105577773 A 5/2016
  (Continued)

*Primary Examiner* — Muhammad Shafi
(74) *Attorney, Agent, or Firm* — Harness, Dickey & Pierce, P.L.C.

(57) ABSTRACT

The present disclosure provides an method, an apparatus, a device and a storage medium for controlling an unmanned vehicle, where the method includes: receiving control messages transmitted by at least two automatic driving physical apparatuses, where the control messages include indication information; determining an optimal control message according to the indication information in each of the control messages; transmitting the optimal control message to a device for controlling an unmanned vehicle, so that the device for controlling an unmanned vehicle performs driving control on the unmanned vehicle according to the optimal control message. When a plurality of automatic driving physical apparatuses transmit control messages, at this time, the control messages are redundant, and a control message can be selected for execution, so that the unmanned vehicle can receive a control signal in time, which is beneficial to the safe driving of the unmanned vehicle.

20 Claims, 5 Drawing Sheets

(58) Field of Classification Search
CPC ..... B60W 50/0098; B60W 2050/0004; B60W 60/001; G05B 9/03
USPC .......................................................... 701/23
See application file for complete search history.

(56) References Cited

U.S. PATENT DOCUMENTS

| | | | |
|---|---|---|---|
| 9,523,984 B1 * | 12/2016 | Herbach | G05D 1/0088 |
| 9,746,352 B2 * | 8/2017 | Petroski | H04B 13/02 |
| 10,310,504 B2 | 6/2019 | Zhu et al. | |
| 2002/0035428 A1 * | 3/2002 | Baeuerle | G05B 19/042 |
| | | | 701/114 |
| 2003/0224729 A1 * | 12/2003 | Arnold | G08C 17/02 |
| | | | 455/59 |
| 2012/0109464 A1 * | 5/2012 | Mizutani | B60W 10/08 |
| | | | 701/42 |
| 2015/0100207 A1 * | 4/2015 | Yoshimura | B60L 15/2009 |
| | | | 701/41 |
| 2019/0288930 A1 | 9/2019 | Zhang et al. | |

FOREIGN PATENT DOCUMENTS

| | | | |
|---|---|---|---|
| CN | 106020191 A | | 10/2016 |
| CN | 107666400 A | | 2/2018 |
| CN | 108234227 A | | 6/2018 |
| CN | 108445798 A | * | 8/2018 |
| KR | 20050009440 A | | 1/2005 |

\* cited by examiner

METHOD, APPARATUS, DEVICE AND STORAGE MEDIUM FOR CONTROLLING AN UNMANNED VEHICLE

CROSS-REFERENCE TO RELATED APPLICATIONS

This application claims priority to Chinese Patent Application No. 201811005091.2, filed on Aug. 30, 2018, which is hereby incorporated by reference in its entirety.

TECHNICAL FIELD

Embodiments of the present disclosure relate to the field of unmanned vehicle technologies, and in particular, to a method, an apparatus, a device, and a storage medium for controlling an unmanned vehicle.

BACKGROUND

With the development of intelligent technologies, unmanned vehicles began to develop and apply. Unmanned vehicles need to be controlled during the driving of the unmanned vehicles.

In the prior art, in order to improve the safety of the automatic driving, a plurality of automatic driving physical apparatuses are set for an unmanned vehicle, and then a chassis of the unmanned vehicle is controlled by the plurality of automatic driving physical apparatuses, so that the unmanned vehicle can timely receive a control command to drive.

In the prior art, when the plurality of automatic driving physical apparatuses simultaneously transmit control commands to the chassis of the unmanned vehicle, the unmanned vehicle is not able to know which control command to select for execution, thereby leading to the occurrence of problems in control of the unmanned vehicle, which is not conducive to the safe driving of the unmanned vehicle.

SUMMARY

Embodiments of the present disclosure provide a method, an apparatus, a device, and a storage medium for controlling an unmanned vehicle, which are used to solve the problem that the occurrence of problems in the control of the unmanned vehicle, which is not conducive to the safe driving of the unmanned vehicle.

A first aspect of the present disclosure provides a method for controlling an unmanned vehicle, including:

receiving control messages transmitted by at least two automatic driving physical apparatuses, where the control messages include indication information;

determining an optimal control message according to the indication information in each of the control messages; and transmitting the optimal control message to a device for controlling an unmanned vehicle, so that the device for controlling an unmanned vehicle performs driving control on the unmanned vehicle according to the optimal control message.

Further, the indication information is an automatic driving physical apparatus identifier; and determining the optimal control message according to the indication information in each of the control messages, includes:

determining, according to a pre-stored priority list, an automatic driving physical apparatus identifier having a highest priority, wherein the priority list includes an automatic driving physical apparatus identifier having a priority order; and determining a control message corresponding to the automatic driving physical apparatus identifier having the highest priority as the optimal control message.

Further, the indication information is working state information of the automatic driving physical apparatuses; and determining the optimal control message according to the indication information in each of the control messages, includes:

determining an automatic driving physical apparatus with a best working state according to the working state information of each of the automatic driving physical apparatuses; and determining a control message transmitted by the automatic driving physical apparatus with the best working state as the optimal control message.

Further, after determining the optimal control message according to the indication information in each of the control messages, the method further includes:

performing a discard process on all the control messages except the optimal control message.

Further, when message contents of the control messages are different, after transmitting the optimal control message to the device for controlling an unmanned vehicle, the method further includes:

sorting each of the control messages according to the indication information in each of the control messages, to obtain a message list, where the message list includes the control messages sorted by priorities from high to low; and transmitting, to the device for controlling an unmanned vehicle, the control messages except the optimal control message in the message list, in order of the priorities from high to low, every preset time period.

Further, the receiving control messages transmitted by at least two automatic driving physical apparatuses includes:

receiving the control messages transmitted by the at least two automatic driving physical apparatuses within a time window.

Further, transmitting the optimal control message to the device for controlling an unmanned vehicle, so that the device for controlling an unmanned vehicle performs driving control on the unmanned vehicle according to the optimal control message, includes:

converting the optimal control message into a control signal; and transmitting the control signal to the device for controlling an unmanned vehicle, so that the device for controlling an unmanned vehicle performs driving control on the unmanned vehicle according to the control signal.

Further, the device for controlling an unmanned vehicle is any one of the following:

a chassis control device, a brake device, and an automatic driving control device for an unmanned vehicle.

Further, a format of the control messages is any one of the following:

a hypertext transfer protocol (HTTP) message, a transmission control protocol (TCP) message, an internet protocol (IP) message, an address resolution protocol (ARP) message, a packet internet groper (PING) message, and a controller area network (CAN) message.

A second aspect of the present disclosure provides an apparatus for controlling an unmanned vehicle, including:

a receiving module, configured to receive control messages transmitted by at least two automatic driving physical apparatuses, where the control messages include indication information;

a determining module, configured to determine an optimal control message according to the indication information in each of the control messages; and a transmitting module, configured to transmit the optimal control message to a device for controlling an unmanned vehicle, so that the device for controlling an unmanned vehicle performs driving control on the unmanned vehicle according to the optimal control message.

Further, the indication information is an automatic driving physical apparatus identifier; and the determining module is specifically configured to:

determine, according to a pre-stored priority list, an automatic driving physical apparatus identifier having a highest priority, wherein the priority list includes an automatic driving physical apparatus identifier having a priority order; and determine a control message corresponding to the automatic driving physical apparatus identifier having the highest priority as the optimal control message.

Further, the indication information is working state information of the automatic driving physical apparatuses; and the determining module is specifically configured to:

determine an automatic driving physical apparatus with a best working state according to the working state information of each of the automatic driving physical apparatuses; and determine a control message transmitted by the automatic driving physical apparatus with the best working state as the optimal control message.

Further, the apparatus further includes:

a discarding module, configured to perform a discard process on all the control messages except the optimal control message after the determining module determines the optimal control message according to the indication information in each of the control messages.

Further, when message contents of the control messages are different, the apparatus further includes:

a sorting module, configured to: after the transmitting module transmits the optimal control message to the device for controlling an unmanned vehicle, sort each of the control messages according to the indication information in each of the control messages, to obtain a message list, where the message list includes the control messages sorted by priorities from high to low; and a processing module, configured to transmit, to the device for controlling an unmanned vehicle, the control messages except the optimal control message in the message list, in order of the priorities from high to low, every preset time period.

Further, the receiving module is specifically configured to:

receive the control messages transmitted by the at least two automatic driving physical apparatuses within a time window.

Further, the transmitting module includes:

a converting submodule, configured to convert the optimal control message into a control signal; and a transmitting submodule, configured to transmit the control signal to the device for controlling an unmanned vehicle, so that the device for controlling an unmanned vehicle performs driving control on the unmanned vehicle according to the control signal.

Further, the device for controlling an unmanned vehicle is any one of the following:

a chassis control device, a brake device, and an automatic driving control device for an unmanned vehicle.

Further, a format of the control messages is any one of the following:

a hypertext transfer protocol (HTTP) message, a transmission control protocol (TCP) message, an internet protocol (IP) message, an address resolution protocol (ARP) message, a packet internet groper (PING) message, and a controller area network (CAN) message.

A third aspect of the present disclosure provides a control device, including: a transmitter, a receiver, a memory, and a processor;

the memory is configured to store a computer instruction; and the processor is configured to execute the computer instruction stored in the memory to implement the method for controlling an unmanned vehicle provided by any of the implementations of the first aspect.

A fourth aspect of the present disclosure provides a storage medium, including: a readable storage medium and a computer instruction, where the computer instruction is stored in the readable storage medium; and the computer instruction is configured to implement the method for controlling an unmanned vehicle provided by any of the implementations of the first aspect.

The method, the apparatus, the device and the storage medium for controlling an unmanned vehicle provided by the embodiments of the present disclosure, by receiving control messages transmitted by at least two automatic driving physical apparatuses, where the control messages include indication information, determining an optimal control message according to the indication information in each of the control messages, and transmitting the optimal control message to a device for controlling an unmanned vehicle, enable the device for controlling an unmanned vehicle to perform driving control on the unmanned vehicle according to the optimal control message. When a plurality of automatic driving physical apparatuses transmit control messages, at this time, the control messages are redundant, and a control message can be selected for execution, so that the unmanned vehicle can receive a control signal in time, which is beneficial to the safe driving of the unmanned vehicle.

BRIEF DESCRIPTION OF THE DRAWINGS

In order to more clearly illustrate the technical solutions in the embodiments of the present disclosure or in the prior art, the drawings used in the embodiments or the prior art description will be briefly described below. Obviously, the drawings in the following description are some embodiments of the present disclosure, and other drawings can be obtained according to these drawings without any creative efforts for those skilled in the art.

DETAILED DESCRIPTION OF THE EMBODIMENTS

The technical solutions in the embodiments of the present disclosure are clearly and completely described in the following with reference to the accompanying drawings in the embodiments of the present disclosure. Obviously, the described embodiments are only a part of embodiments of the present disclosure, not all embodiments of the present disclosure. All other embodiments obtained by persons of ordinary skill in the art based on the embodiments of the present disclosure without creative efforts shall fall within the protection scope of the present disclosure.

In the prior art, in order to improve the safety of the automatic driving, a plurality of automatic driving physical apparatuses are set for an unmanned vehicle, and then a chassis of the unmanned vehicle is controlled by the plurality of automatic driving physical apparatuses, so that the unmanned vehicle can timely receive a control command to drive.

In the prior art, when the plurality of automatic driving physical apparatuses simultaneously transmit control commands to the chassis of the unmanned vehicle, the unmanned vehicle is not able to know which control command to select for execution, thereby leading to the occurrence of problems in control of the unmanned vehicle, which is not conducive to the safe driving of the unmanned vehicle.

In view of the above problems, the present disclosure provides a method, an apparatus, a device, and a storage medium for controlling an unmanned vehicle, which can select a control message when a plurality of automatic driving physical apparatuses transmit control messages, that is, the control messages are redundant at that time, so that the unmanned vehicle can receive a control signal in time, which is beneficial to the safe driving of the unmanned vehicle. The solution will be described in detail below through several specific embodiments.

Figure 1:
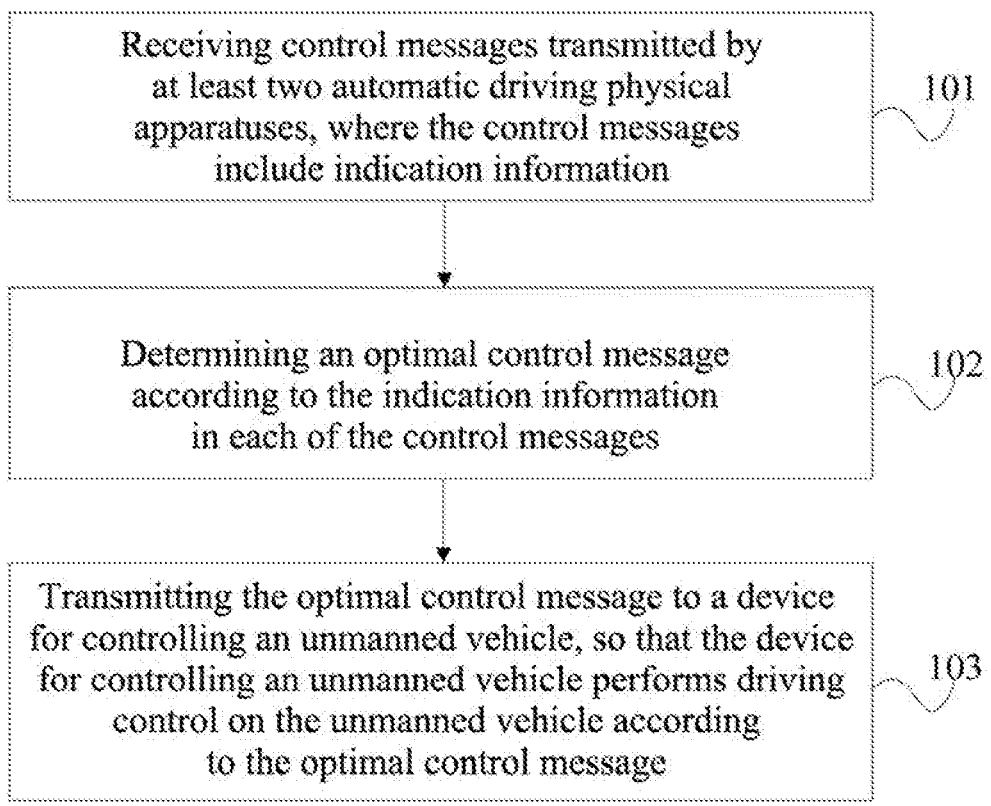
FIG. 1 is a flowchart diagram of a method for controlling an unmanned vehicle according to an embodiment of the present disclosure.

FIG. 1 is a flowchart diagram of a method for controlling an unmanned vehicle according to an embodiment of this disclosure. As shown in FIG. 1, an executive body in this solution is a controller of an unmanned vehicle, a control device of an unmanned vehicle, or a control device of an autonomous driving system of an unmanned vehicle, etc., and the method for controlling an unmanned vehicle includes:

Step 101: receiving control messages transmitted by at least two automatic driving physical apparatuses, where the control messages include indication information.

In this step, specifically, the present embodiment is described with that the executive body is a controller of an unmanned vehicle.

When a plurality of automatic driving physical apparatuses simultaneously transmit control messages to a chassis of the unmanned vehicle, the controller of the unmanned vehicle can receive the control messages respectively transmitted by the plurality of automatic driving physical apparatuses, and the control message transmitted by each of the automatic driving physical apparatuses includes indication information, and the indication information is used to determine an optimal control message.

Step 102: determining an optimal control message according to the indication information in each of the control messages.

In this step, specifically, the controller of the unmanned vehicle analyzes the plurality of automatic driving physical apparatuses according to the indication information in the control message transmitted by each of the automatic driving physical apparatuses, thereby determines an optimal automatic driving physical apparatus, and then determines a control message corresponding to the optimal automatic driving physical apparatus. Alternatively, the controller of the unmanned vehicle analyzes the multiple control messages according to the indication information in the control message transmitted by each of the automatic driving physical apparatuses, and thereby determines the optimal control message.

For example, the unmanned vehicle is provided with an automatic driving physical apparatus 1, an automatic driving physical apparatus 2, an automatic driving physical apparatus 3, an automatic driving physical apparatus 4, and an automatic driving physical apparatus 5; the automatic driving physical apparatus 1, the automatic driving physical apparatus 2, the automatic driving physical apparatus 3, the automatic driving physical apparatus 4, and the automatic driving physical apparatus 5 are respectively connected with the controller of the unmanned vehicle; the automatic driving physical apparatus 1 transmits a control message 1 to the controller of the unmanned vehicle, the automatic driving physical apparatus 2 transmits a control message 2 to the controller of the unmanned vehicle, the automatic driving physical apparatus 3 transmits a control message 3 to the controller of the unmanned vehicle, the automatic driving physical apparatus 4 transmits a control message 4 to the controller of the unmanned vehicle, and the automatic driving physical apparatus 5 transmits a control message 5 to the controller of the unmanned vehicle, and each control message includes a piece of indication information; the controller of the unmanned vehicle can determine the optimal control message, which is the control message 2.

Step 103: transmitting the optimal control message to a device for controlling an unmanned vehicle, so that the device for controlling an unmanned vehicle performs driving control on the unmanned vehicle according to the optimal control message.

In this step, specifically, the controller of the unmanned vehicle transmits the determined optimal control message to the device for controlling an unmanned vehicle; the device for controlling an unmanned vehicle controls the driving of unmanned vehicle according to the content indicated by the optimal control message.

For example, the controller of the unmanned vehicle can determine the optimal control message, which is the control message 2, where the control message 2 indicates that the unmanned vehicle performs steering; the controller of the unmanned vehicle transmits the control message 2 to a chassis control device of the unmanned vehicle; then, the chassis control device controls the unmanned vehicle to perform steering according to the control message 2.

This embodiment, by receiving control messages transmitted by at least two automatic driving physical apparatuses, where the control messages include indication information, determining an optimal control message according to the indication information in each of the control messages, and transmitting the optimal control message to a device for controlling an unmanned vehicle, enable the device for controlling an unmanned vehicle to perform driving control on the unmanned vehicle according to the optimal control message. When a plurality of automatic driving physical apparatuses transmit control messages, at this time, the control messages are redundant, and a control message can be selected for execution, so that the unmanned vehicle can receive a control signal in time, which is beneficial to the safe driving of the unmanned vehicle.

Figure 2:
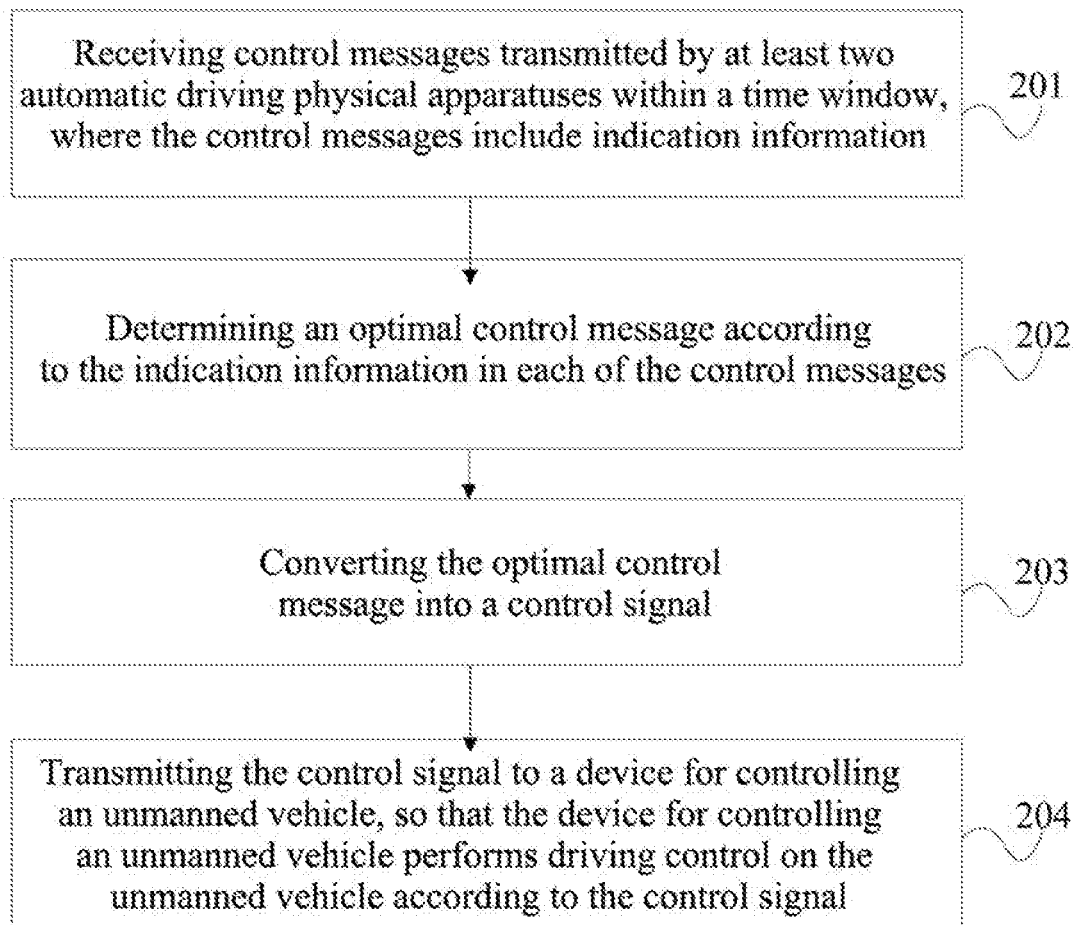
FIG. 2 is a flowchart diagram of another method for controlling an unmanned vehicle according to an embodiment of the present disclosure.

FIG. 2 is a flowchart diagram of another method for controlling an unmanned vehicle according to an embodiment of the present disclosure. As shown in FIG. 2, an executive body in this solution is a controller of an unmanned vehicle, a control device of an unmanned vehicle, or a control device of an autonomous driving system of an unmanned vehicle, etc., and the method for controlling an unmanned vehicle includes:

Step 201: receiving control messages transmitted by at least two automatic driving physical apparatuses within a time window, where the control messages include indication information.

Optionally, a format of the control messages is any one of the following: a hypertext transfer protocol (HTTP) message, a transmission control protocol (TCP) message, an internet protocol (IP) message, an address resolution protocol (ARP) message, a packet internet groper (PING) message, and a controller area network (CAN) message.

In this step, specifically, the present embodiment is described with that the executive body is a controller of an unmanned vehicle.

When a plurality of automatic driving physical apparatuses simultaneously transmit control messages to a chassis of the unmanned vehicle, the controller of the unmanned vehicle receives the control messages transmitted by at least two automatic driving physical apparatuses within a time window, and the control message of each of the automatic driving physical apparatuses includes indication information; each of the automatic driving physical apparatuses is disposed in the unmanned vehicle. Moreover, a plurality of time windows are set, and a plurality of control messages are received in each time window.

For example, the unmanned vehicle is provided with an automatic driving physical apparatus 1, an automatic driving physical apparatus 2, an automatic driving physical apparatus 3, an automatic driving physical apparatus 4, and an automatic driving physical apparatus 5; the automatic driving physical apparatus 1, the automatic driving physical apparatus 2, the automatic driving physical apparatus 3, the automatic driving physical apparatus 4, and the automatic driving physical apparatus 5 are respectively connected with the controller of the unmanned vehicle; in a time window 1, the automatic driving physical apparatus 1 transmits a control message 1 to the controller of the unmanned vehicle, the automatic driving physical apparatus 2 transmits a control message 2 to the controller of the unmanned vehicle, and the automatic driving physical apparatus 3 transmits a control message 3 to the controller of the unmanned vehicle; in a time window 2, the automatic driving physical apparatus 4 transmits a control message 4 to the controller of the unmanned vehicle, and the automatic driving physical apparatus 5 transmits a control message 5 to the controller of the unmanned vehicle, and each control message includes a piece of indication information. It can be seen that the automatic driving physical apparatus 1, the automatic driving physical apparatus 2, and the automatic driving physical apparatus 3 simultaneously transmit control messages to the controller of the unmanned vehicle at a time, and the automatic driving physical apparatus 4 and the automatic driving physical apparatus 5 simultaneously transmit control messages to the controller of the unmanned vehicle at another time.

Step 202: determining an optimal control message according to the indication information in each of the control messages.

Step 202 includes the following implementations.

A first implementation of the step 202 is that when the indication information is an automatic driving physical apparatus identifier, the step 202 specifically includes:

Step 2021a: determining, according to a pre-stored priority list, an automatic driving physical apparatus identifier having a highest priority, where the priority list includes an automatic driving physical apparatus identifier having a priority order; and Step 2022a: determining a control message corresponding to the automatic driving physical apparatus identifier having the highest priority as the optimal control message.

A second implementation of the step 202 is that when the indication information is working state information of the automatic driving physical apparatuses, the step 202 specifically includes:

Step 2021b: determining an automatic driving physical apparatus with a best working state according to the working state information of each of the automatic driving physical apparatuses; and Step 2022b: determining a control message transmitted by the automatic driving physical apparatus with the best working state as the optimal control message.

In this step, specifically, this step provides the following implementations.

A first implementation is as follows.

The indication information in the control messages may be an automatic driving physical apparatus identifier. A priority list is stored in the controller of the unmanned vehicle, the priority list includes a plurality of automatic driving physical apparatus identifiers, and the automatic driving physical apparatus identifiers in the priority list have priority orders. The controller of the unmanned vehicle can find out an automatic driving physical apparatus identifier with a highest priority among the plurality of received automatic driving physical apparatus identifiers according to the priority list. Then, the controller of the unmanned vehicle can determine a control message corresponding to the automatic driving physical apparatus identifier with the highest priority as the optimal control message.

For example, the unmanned vehicle is provided with an automatic driving physical apparatus 1, an automatic driving physical apparatus 2, an automatic driving physical apparatus 3, an automatic driving physical apparatus 4, an automatic driving physical apparatus 5; the automatic driving physical apparatus 1, the automatic driving physical apparatus 2, the automatic driving physical apparatus 3, the automatic driving physical apparatus 4, and the automatic driving physical apparatus 5 are respectively connected with the controller of the unmanned vehicle. At a same time, the automatic driving physical apparatus 1 transmits a control message 1 to the controller of the unmanned vehicle, the control message 1 including an automatic driving physical apparatus identifier 1, the automatic driving physical apparatus 2 transmits a control message 2 to the controller of the unmanned vehicle, the control message 2 including an automatic driving physical apparatus identifier 2, the automatic driving physical apparatus 3 transmits a control message 3 to the controller of the unmanned vehicle, the control message 3 including an automatic driving physical apparatus identifier 3, the automatic driving physical apparatus 4 transmits a control message 4 to the controller of the unmanned vehicle, the control message 4 including an automatic driving physical apparatus identifier 4, and the automatic driving physical apparatus 5 transmits a control message 5 to the controller of the unmanned vehicle, the control message 5 including an automatic driving physical apparatus identifier 5. In the priority list, rankings in the priority orders from high to low are the automatic driving physical apparatus identifier 2, an automatic driving physical apparatus identifier 7, the automatic driving physical apparatus identifier 3, the automatic driving physical apparatus identifier 1, the automatic driving physical apparatus identifier 4, the automatic driving physical apparatus identifier 5, and an automatic driving physical apparatus identifier 6. The controller of the unmanned vehicle can determine that the automatic driving physical apparatus identifier 2 has the highest priority among the received automatic driving physical apparatus identifier. The controller of the unmanned vehicle determines that the control message 2 corresponding to the automatic driving physical apparatus identifier 2 with the highest priority is the optimal control message.

A second implementation is as follows.

The indication information in the control messages may be working state information of the automatic driving physical apparatus. The controller of the unmanned vehicle can analyze the received working state information of each of the automatic driving physical apparatuses, and then analyze working states of the automatic driving physical apparatuses to determine an automatic driving physical apparatus with a best working state. Then, the controller of the unmanned vehicle can determine a control message transmitted by the automatic driving physical apparatus with the best working state as the optimal control message. The working state information is at least one of the following: a working voltage of an automatic driving physical apparatus, a working current of the automatic driving physical apparatus, other operating parameters of the automatic driving physical apparatus, and the like.

Here, if the controller of the unmanned vehicle determines that the working voltage of the automatic driving physical apparatus is within a preset voltage range, it is determined that the working state of the automatic driving physical apparatus is good; and if the controller of the unmanned vehicle determines that the working voltage of the automatic driving physical apparatus is not within the preset voltage range, it is determined that the working state of the automatic driving physical apparatus is poor. If the controller of the unmanned vehicle determines that the working current of the automatic driving physical apparatus is within a preset current range, it is determined that the working state of the automatic driving physical apparatus is good; and if the controller of the unmanned vehicle determines that the working current of the automatic driving physical apparatus is not within the preset current range, it is determined that the working state of the automatic driving physical device is poor.

The controller of the unmanned vehicle can perform a comprehensive analysis of the working state information to determine the automatic driving physical apparatus with the best working state. For example, the controller of the unmanned vehicle determines that the working voltage of an automatic driving physical apparatus 1 is within the preset voltage range, and the working current of the automatic driving physical apparatus 1 is within the preset current range; the controller of the unmanned vehicle determines the working voltage of an automatic driving physical apparatus 2 is not within the preset voltage range, and the working current of the automatic driving physical apparatus 2 is not within the preset current range; and the controller of the unmanned vehicle determines that the working voltage of the automatic driving physical apparatus 3 is not within the preset voltage range, and the working current of the automatic driving physical apparatus 3 is within the preset current range. Then the controller of the unmanned vehicle determines that rankings in the working states from good to poor are the automatic driving physical apparatus 1, the automatic driving physical apparatus 3, and the automatic driving physical apparatus 2.

For example, the unmanned vehicle is provided with an automatic driving physical apparatus 1, an automatic driving physical apparatus 2, an automatic driving physical apparatus 3, an automatic driving physical apparatus 4, and an automatic driving physical apparatus 5; the automatic driving physical apparatus 1, the automatic driving physical apparatus 2, the automatic driving physical apparatus 3, the automatic driving physical apparatus 4, and the automatic driving physical apparatus 5 are respectively connected with the controller of the unmanned vehicle. At a same time, the automatic driving physical apparatus 1 transmits a control message 1 to the controller of the unmanned vehicle, the control message 1 including working state information 1 of the automatic driving physical apparatus 1; the automatic driving physical apparatus 2 transmits a control message 2 to the controller of the unmanned vehicle, the control message 2 including working state information 2 of the automatic driving physical apparatus 2; the automatic driving physical apparatus 3 transmits a control message 3 to the controller of the unmanned vehicle, the control message 3 including working state information 3 of the automatic driving physical apparatus 3; the automatic driving physical apparatus 4 transmits a control message 4 to the controller of the unmanned vehicle, the control message 4 including working state information 4 of the automatic driving physical apparatus 4; and the automatic driving physical apparatus 5 transmits a control message 5 to the controller of the unmanned vehicle, the control message 5 including working state information 5 of the automatic driving physical apparatus 5. The controller of the unmanned vehicle can comprehensively analyze the working state information, and determine that the automatic driving physical apparatus with the best working state is the automatic driving physical apparatus 3; and the controller of the unmanned vehicle determines the control message 3 transmitted by the automatic driving physical apparatus 3 as the optimal control message.

Step 203: converting the optimal control message into a control signal.

In this step, specifically, the controller of the unmanned vehicle converts the optimal control message into a control signal.

Step 204: transmitting the control signal to the device for controlling an unmanned vehicle, so that the device for controlling an unmanned vehicle performs driving control on the unmanned vehicle according to the control signal.

Optionally, the device for controlling an unmanned vehicle is any one of the following: a chassis control device, a brake device, and an automatic driving control device for an unmanned vehicle.

In this step, specifically, the controller of the unmanned vehicle transmits the obtained control signal to the device for controlling an unmanned vehicle; and then the device for controlling an unmanned vehicle performs driving control on the unmanned vehicle according to the control signal.

For example, the controller of the unmanned vehicle determines an optimal control message indicating that the chassis of the unmanned vehicle is to be controlled; the controller of the unmanned vehicle converts the control message into a chassis control signal; the controller of the unmanned vehicle transmits the chassis control signal to the chassis control device; the chassis control device controls an automatic driving process of the unmanned vehicle according to the chassis control signal, for example, controlling the unmanned vehicle to change a direction.

For another example, the controller of the unmanned vehicle determines an optimal control message indicating that a braking process of the unmanned vehicle is to be controlled; the controller of the unmanned vehicle converts the control message into a brake control signal; the controller of the unmanned vehicle transmits the brake control signal to the brake device; the brake device controls the automatic driving process of the unmanned vehicle according to the brake control signal, for example, controlling the unmanned vehicle to brake or accelerate it.

In this embodiment, by setting priorities for the automatic driving physical apparatuses, and when a plurality of automatic driving physical apparatuses simultaneously sending control messages, selecting a control message transmitted by the automatic driving physical apparatus with the highest priority, or, selecting a control message transmitted by the automatic driving physical apparatus with the best working state, and converting the selected optimal control message into a control signal, the unmanned vehicle is enabled to control the automatic driving process of the unmanned vehicle according to the control signal. When the control messages from a plurality of automatic driving physical apparatuses are redundant, one control message can be selected for execution, so that the unmanned vehicle can receive the control signal in time, which is beneficial to the safe driving of the unmanned vehicle.

Figure 3:
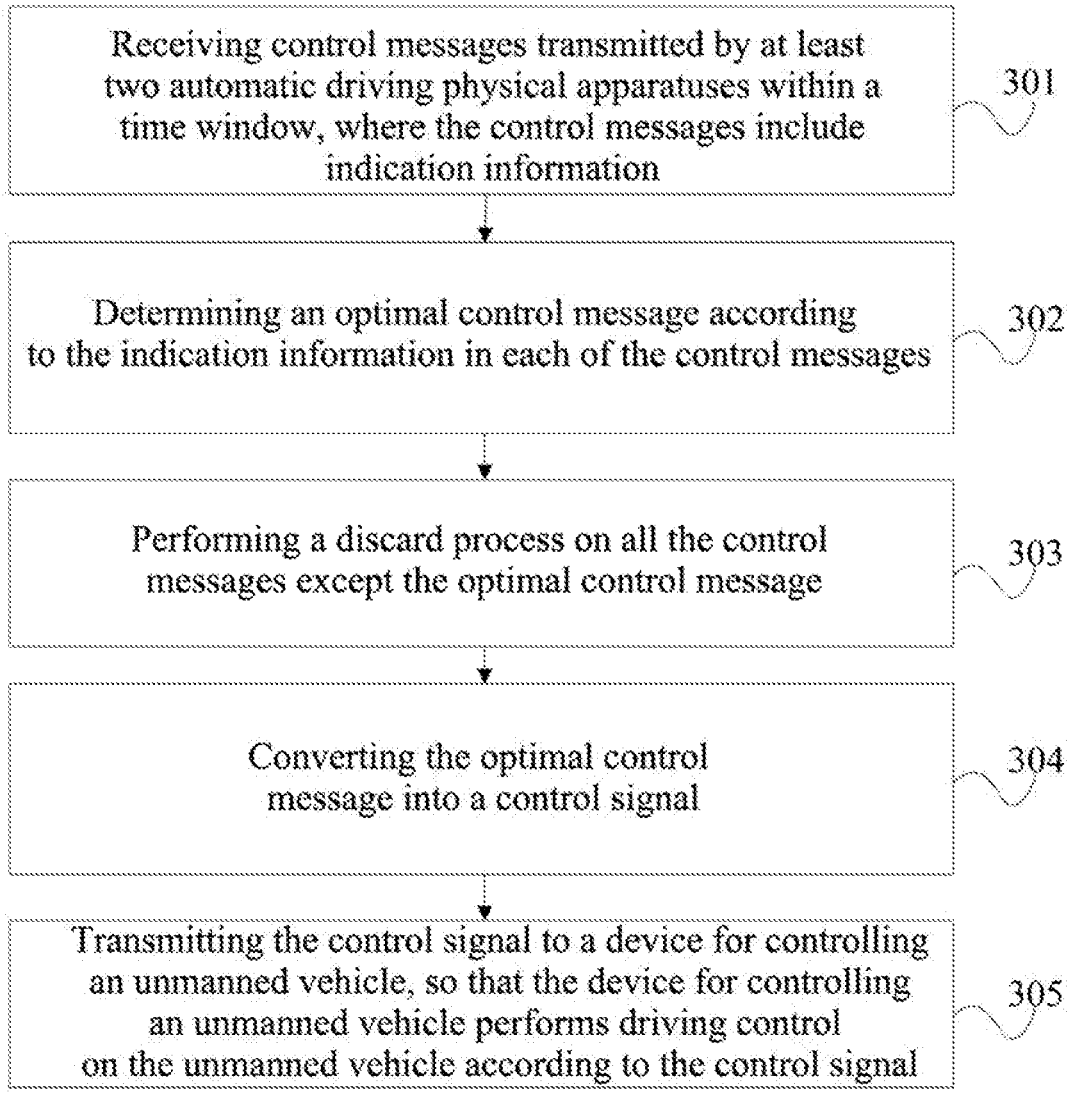
FIG. 3 is a flowchart diagram of still another method for controlling an unmanned vehicle according to an embodiment of the present disclosure.

FIG. 3 is a flowchart diagram of still another method for controlling an unmanned vehicle according to an embodiment of the present disclosure. As shown in FIG. 3, an executive body in this solution is a controller of an unmanned vehicle, a control device of an unmanned vehicle, or a control device of an autonomous driving system of an unmanned vehicle, etc., and the method for controlling an unmanned vehicle includes:

Step 301: receiving the control messages transmitted by the at least two automatic driving physical apparatuses within a time window, where the control messages include indication information.

In this step, specifically, the present embodiment is described with that the executive body is a controller of an unmanned vehicle.

For this step, reference can be made to step 201 in FIG. 2, and details are not described here again.

Step 302: determining an optimal control message according to the indication information in each of the control messages.

In this step, specifically, reference for this step can be made to step 202 in FIG. 2, and details are not described here again.

When message contents of the control messages are the same or different, after step 302, step 303 is further included: performing a discard process on all the control messages except the optimal control message.

In this step, specifically, if the controller of the unmanned vehicle determines that the message contents of a plurality of control messages are the same, the controller of the unmanned vehicle only retains a control message transmitted by the automatic driving physical apparatus with the highest priority, or, the controller of the unmanned vehicle only retains a control message transmitted by the automatic driving physical apparatus with the best working state; then the controller of the unmanned vehicle discards the control messages transmitted by other automatic driving physical apparatuses.

For example, at a same time, an automatic driving physical apparatus 1 transmits a control message 1 to the controller of the unmanned vehicle, the control message 1 including working state information 1 of the automatic driving physical apparatus 1; an automatic driving physical apparatus 2 transmits a control message 2 to the controller of the unmanned vehicle, the control message 2 including working state information 2 of the automatic driving physical apparatus 2; an automatic driving physical apparatus 3 transmits a control message 3 to the controller of the unmanned vehicle, the control message 3 including working state information 3 of the automatic driving physical apparatus 3; an automatic driving physical apparatus 4 transmits a control message 4 to the controller of the unmanned vehicle, the control message 4 including working state information 4 of the automatic driving physical apparatus 4; and an automatic driving physical apparatus 5 transmits a control message 5 to the controller of the unmanned vehicle, the control message 5 including working state information 5 of the automatic driving physical apparatus 5. The controller of the unmanned vehicle can comprehensively analyze the working state information, and determine that the automatic driving physical apparatus with the best working state is the automatic driving physical apparatus 3; the controller of the unmanned vehicle determines the control message 3 transmitted by the automatic driving physical apparatus 3 as the optimal control message. Then, the controller of the unmanned vehicle discards the control message 1, the control message 2, the control message 4, and the control message 5.

Step 304: converting the optimal control message into a control signal.

In this step, specifically, reference for this step can be made to step 203 in FIG. 2, and details are not described here again.

Step 305: transmitting the control signal to the device for controlling an unmanned vehicle, so that the device for controlling an unmanned vehicle performs driving control on the unmanned vehicle according to the control signal.

In this step, specifically, reference for this step can be made to step 204 in FIG. 2, and details are not described here again.

In this embodiment, by setting priorities for the automatic driving physical apparatuses, and when a plurality of automatic driving physical apparatuses simultaneously sending control messages, selecting a control message transmitted by the automatic driving physical apparatus with the highest priority, or, selecting a control message transmitted by the automatic driving physical apparatus with the best working state, and converting the selected optimal control message into a control signal, the unmanned vehicle is enabled to control the automatic driving process of the unmanned vehicle according to the control signal. When the control messages from a plurality of automatic driving physical apparatuses are redundant, one control message can be selected for execution, so that the unmanned vehicle can receive the control signal in time, which is beneficial to the safe driving of the unmanned vehicle. And the needless control messages are discarded, saving the memory and space of the system of the unmanned vehicle.

Figure 4:
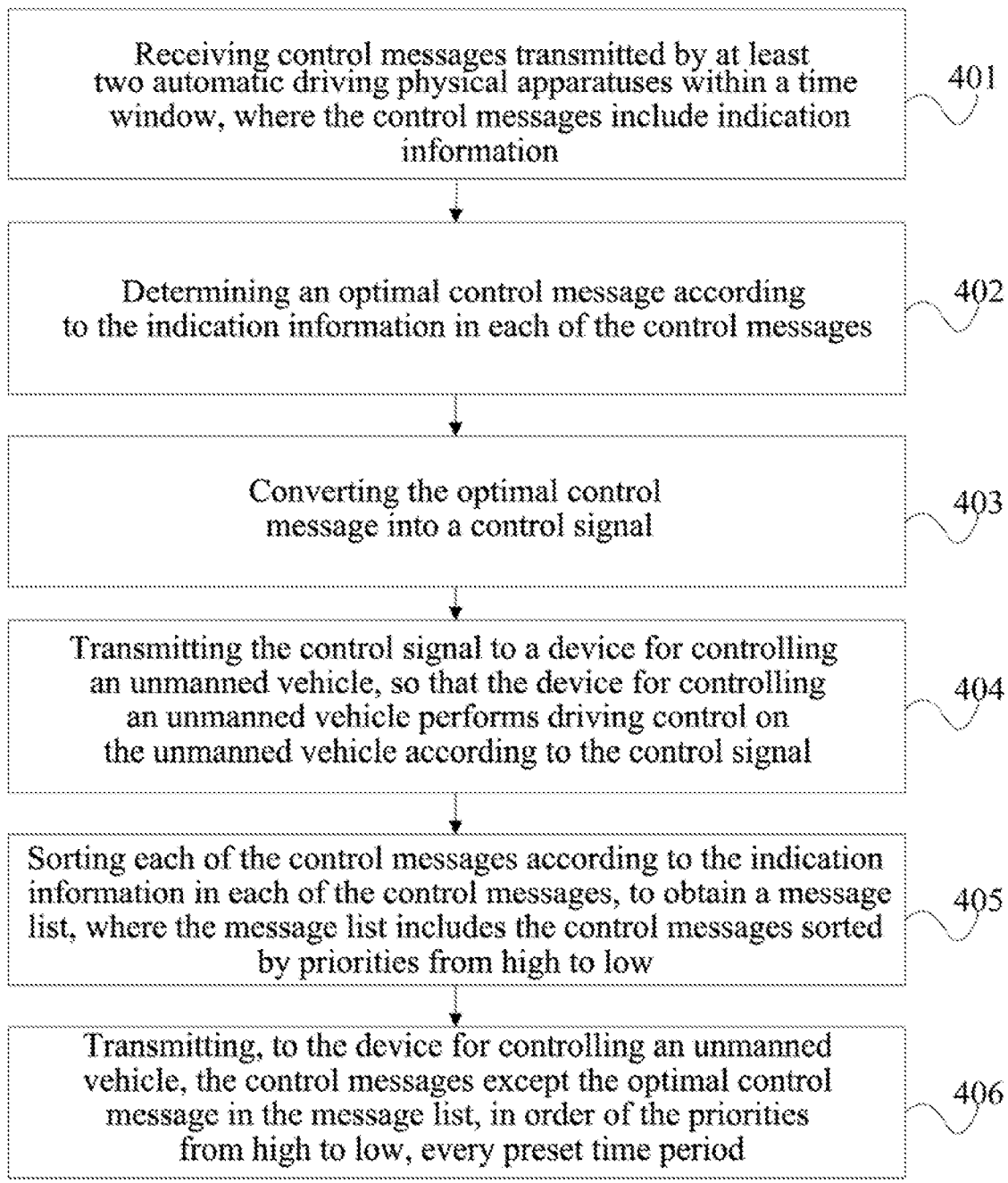
FIG. 4 is a flowchart diagram of still another method for controlling an unmanned vehicle according to an embodiment of the present disclosure.

FIG. 4 is a flowchart diagram of still another method for controlling an unmanned vehicle according to an embodiment of the present disclosure. As shown in FIG. 4, an executive body in this solution is a controller of an unmanned vehicle, a control device of an unmanned vehicle, or a control device of an autonomous driving system of an unmanned vehicle, etc., and the method for controlling an unmanned vehicle includes:

Step 401: receiving the control messages transmitted by the at least two automatic driving physical apparatuses within a time window, where the control messages include indication information.

In this step, specifically, the present embodiment is described with that the executive body is a controller of an unmanned vehicle.

For this step, reference can be made to step 201 in FIG. 2, and details are not described here again.

Step 402: determining an optimal control message according to the indication information in each of the control messages.

In this step, specifically, reference for this step can be made to step 202 in FIG. 2, and details are not described here again.

Step 403: converting the optimal control message into a control signal.

In this step, specifically, reference for this step can be made to step 203 in FIG. 2, and details are not described here again.

Step 404: transmitting the control signal to the device for controlling an unmanned vehicle, so that the device for controlling an unmanned vehicle performs driving control on the unmanned vehicle according to the control signal.

In this step, specifically, reference for this step can be made to step 204 in FIG. 2, and details are not described here again.

When message contents of the control messages are different, after step 404, steps 405-406 are further included:

Step 405: sorting each of the control messages according to the indication information in each of the control messages, to obtain a message list, where the message list includes the control messages sorted by priorities from high to low.

In this step, specifically, the controller of the unmanned vehicle stores a priority list, the priority list includes a plurality of automatic driving physical apparatus identifiers, and the automatic driving physical apparatus identifiers in the priority list have priority orders. If the controller of the unmanned vehicle determines that the message contents of the plurality of control messages are different, the controller of the unmanned vehicle sorts the control messages transmitted by the respective automatic driving physical apparatuses according to the priority orders of the automatic driving physical apparatuses, and a message list is obtained, where the message list includes control messages with priorities from high to low.

Step 406: transmitting, to the device for controlling an unmanned vehicle, the control messages except the optimal control message in the message list, in order of the priorities from high to low, every preset time period.

In this step, specifically, after the controller of the unmanned vehicle converts the optimal control message into the control signal and transmits the control signal to the device for controlling an unmanned vehicle, the controller of the unmanned vehicle sequentially converts the control messages except the optimal control message into control signals according to the priority orders in the message list and transmits the control signals to the device for controlling an unmanned vehicle.

For example, at a same time, an automatic driving physical apparatus 1 transmits a control message 1 to the controller of the unmanned vehicle, and the control message 1 includes an automatic driving physical apparatus identifier 1; an automatic driving physical apparatus 2 transmits a control message 2 to the controller of the unmanned vehicle, and the control message 2 includes an automatic driving physical apparatus identifier 2; an automatic driving physical apparatus 3 transmits a control message 3 to the controller of the unmanned vehicle, and the control message 3 includes an automatic driving physical apparatus identifier 3; an automatic driving physical apparatus 4 transmits a control message 4 to the controller of the unmanned vehicle, and the control message 4 includes an automatic driving physical apparatus identifier 4; and an automatic driving physical apparatus 5 transmits a control message 5 to the controller of the unmanned vehicle, and the control message 5 includes an automatic driving physical apparatus identifier 5. The controller of the unmanned vehicle determines that the control message 2 corresponding to the highest priority automatic driving physical apparatus identifier 2 is the optimal control message. In the priority list, rankings in the priority orders from high to low are the automatic driving physical apparatus identifier 2, an automatic driving physical apparatus identifier 7, the automatic driving physical apparatus identifier 3, the automatic driving physical apparatus identifier 1, the automatic driving physical apparatus identifier 4, the automatic driving physical apparatus identifier 5, and an automatic driving physical apparatus identifier 6. The controller of the unmanned vehicle converts the optimal control message into a control signal and transmits the control signal to the device for controlling an unmanned vehicle. Then, the controller of the unmanned vehicle determines, according to the priority list, rankings in the priorities from high to low as the automatic driving physical apparatus identifier 2, the automatic driving physical apparatus identifier 3, the automatic driving physical apparatus identifier 1, the automatic driving physical apparatus identifier 4, and the automatic driving physical apparatus identifier 5, and removes the automatic driving physical apparatus identifier 2. Then, the controller of the unmanned vehicle converts the control message 3 transmitted by the automatic driving physical apparatus 3 into a control signal, and transmits the control signal to the device for controlling an unmanned vehicle; then, the controller of the unmanned vehicle converts the control message 1 transmitted by the automatic driving physical apparatus 1 into a control signal, and transmits the control signal to the device for controlling an unmanned vehicle; then, the controller of the unmanned vehicle converts the control message 4 transmitted by the automatic driving physical apparatus 4 into a control signal, and transmits the control signal to the device for controlling an unmanned vehicle; and then, the controller of the unmanned vehicle converts the control message 5 transmitted by the automatic driving physical apparatus 5 into a control signal, and transmits the control signal to the device for controlling an unmanned vehicle.

In this embodiment, by setting priorities for the automatic driving physical apparatuses, and when a plurality of automatic driving physical apparatuses simultaneously sending control messages, selecting a control message transmitted by the automatic driving physical apparatus with the highest priority, or, selecting a control message transmitted by the automatic driving physical apparatus with the best working state, and converting the selected optimal control message into a control signal, the unmanned vehicle is enabled to control the automatic driving process of the unmanned vehicle according to the control signal. When the control messages from a plurality of automatic driving physical apparatuses are redundant, one control message can be selected for execution, so that the unmanned vehicle can receive the control signal in time, which is beneficial to the safe driving of the unmanned vehicle. And the other control messages are sorted, and the sorted control messages are sequentially transmitted to the device for controlling an unmanned vehicle, so that the device for controlling an unmanned vehicle sequentially performs the sorted control messages.

Figure 5:
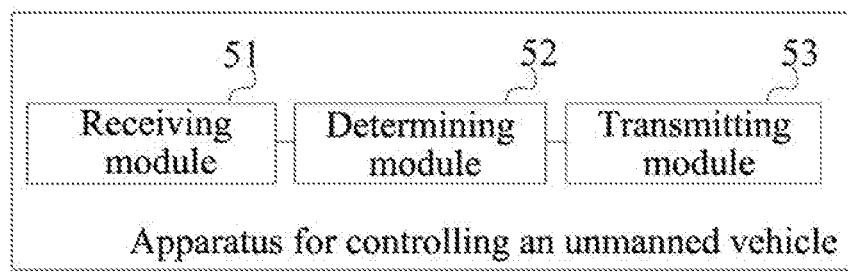
FIG. 5 is a schematic structural diagram of an apparatus for controlling an unmanned vehicle according to an embodiment of the present disclosure.

FIG. 5 is a schematic structural diagram of an apparatus for controlling an unmanned vehicle according to an embodiment of the present disclosure. As shown in FIG. 5, the apparatus for controlling an unmanned vehicle provided in this embodiment includes:

a receiving module 51, configured to receive control messages transmitted by at least two automatic driving physical apparatuses, where the control messages include indication information;

a determining module 52, configured to determine an optimal control message according to the indication information in each of the control messages; and a transmitting module 53, configured to transmit the optimal control message to a device for controlling an unmanned vehicle, so that the device for controlling an unmanned vehicle performs driving control on the unmanned vehicle according to the optimal control message.

Technical solutions in the apparatus for controlling an unmanned vehicle provided in this embodiment is the same as the technical solutions in the method for controlling an unmanned vehicle provided by any of the foregoing embodiments. The implementation principles and technical effects are similar, and details are not described here again.

Figure 6:
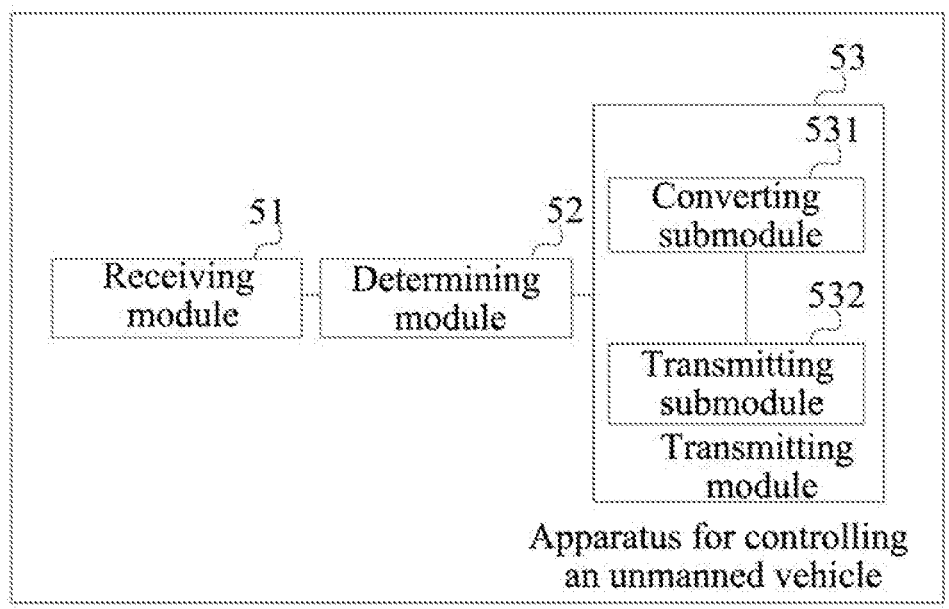
FIG. 6 is a schematic structural diagram of another apparatus for controlling an unmanned vehicle according to an embodiment of the present disclosure.

FIG. 6 is a schematic structural diagram of another apparatus for controlling an unmanned vehicle according to an embodiment of the present disclosure. On the basis of the embodiment shown in FIG. 5, as shown in FIG. 6, in the apparatus for controlling an unmanned vehicle provided by this embodiment, the indication information is an automatic driving physical apparatus identifier; and the determining module 52 is specifically configured to:

determine, according to a pre-stored priority list, an automatic driving physical apparatus identifier having a highest priority, wherein the priority list includes an automatic driving physical apparatus identifier having a priority order; and determine a control message corresponding to the automatic driving physical apparatus identifier having the highest priority as the optimal control message.

The indication information is working state information of the automatic driving physical apparatuses; and the determining module 52 is specifically configured to:

determine an automatic driving physical apparatus with a best working state according to the working state information of each of the automatic driving physical apparatuses; and determine a control message transmitted by the automatic driving physical apparatus with the best working state as the optimal control message.

The receiving module 51 is specifically configured to: receive the control messages transmitted by the at least two automatic driving physical apparatuses within a time window.

The transmitting module 53 includes:

a converting submodule 531, configured to convert the optimal control message into a control signal; and a transmitting submodule 532, configured to transmit the control signal to the device for controlling an unmanned vehicle, so that the device for controlling an unmanned vehicle performs driving control on the unmanned vehicle according to the control signal.

The device for controlling an unmanned vehicle is any one of the following: a chassis control device, a brake device, and an automatic driving control device for an unmanned vehicle.

A format of the control messages is any one of the following: a HTTP message, a TCP message, an IP message, an ARP message, a PING message, and a CAN message.

Optionally, the apparatus provided in this embodiment further includes: a discarding module, configured to perform a discard process on all the control messages except the optimal control message after the determining module 52 determines the optimal control message according to the indication information in each of the control messages.

Optionally, when message contents of the control messages are different, the apparatus provided in this embodiment further includes: a sorting module, configured to sort, after the transmitting module 53 transmits the optimal control message to the device for controlling an unmanned vehicle, each of the control messages according to the indication information in each of the control messages, to obtain a message list, where the message list includes the control messages sorted by priorities from high to low; and a processing module, configured to transmit, to the device for controlling an unmanned vehicle, the control messages except the optimal control message in the message list, in order of the priorities from high to low, every preset time period.

Technical solutions in the apparatus for controlling an unmanned vehicle provided in this embodiment is the same as the technical solutions in the method for controlling an unmanned vehicle provided by any of the foregoing embodiments. The implementation principles and technical effects are similar, and details are not described here again.

Figure 7:
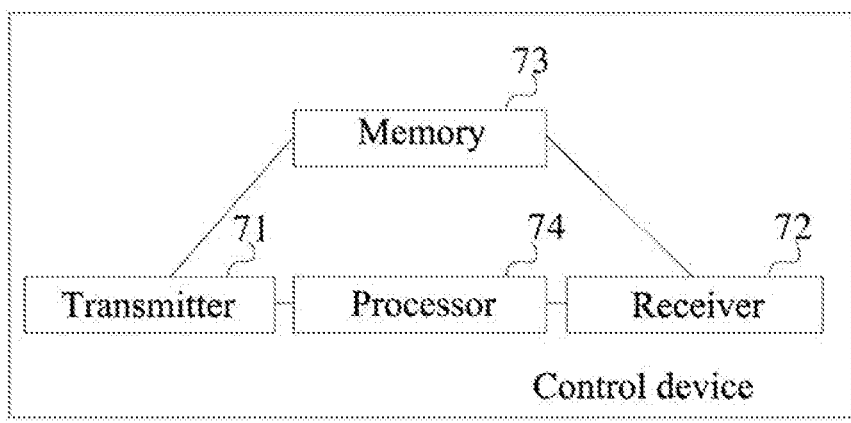
FIG. 7 is a schematic structural diagram of a control device according to an embodiment of the present disclosure.

FIG. 7 is a schematic structural diagram of a control device according to an embodiment of the present disclosure. As shown in FIG. 7, the control device includes: a transmitter 71, a receiver 72, a memory 73, and a processor 74.

The memory 73 is configured to store a computer instruction; and the processor 74 is configured to execute the computer instruction stored in the memory 73 to implement the technical solutions of the method for controlling an unmanned vehicle provided by any of the foregoing embodiments.

The present disclosure further provides a storage medium, including: a readable storage medium and a computer instruction, where the computer instruction is stored in the readable storage medium; the computer instruction is configured to implement the technical solutions of the method for controlling an unmanned vehicle provided by any of the implementations of the foregoing embodiments.

In the specific implementation of the foregoing control device, it should be understood that the processor 74 may be a central processing unit (CPU for short), or may be other general purpose processors, a digital signal processor (DSP for short), an application specific integrated circuit (ASIC for short) or the like. The general purpose processor may be a microprocessor or the processor may be any conventional processor or the like. The steps of the method disclosed in the embodiments of the present disclosure may be directly implemented as being performed by a hardware processor, or performed by a combination of hardware and software modules in the processor.

It will be understood by those skilled in the art that all or part of the steps for implementing the above method embodiments may be performed by hardware related to the program instructions. The aforementioned program can be stored in a computer readable storage medium. The program, when executed, performs the steps including the foregoing method embodiments; and the foregoing storage medium includes: a read-only memory (abbreviation: ROM), a RAM, a flash memory, a hard disk, a solid state hard disk, a magnetic tape, a floppy disk, an optical disc and any combination thereof.

Finally, it should be understood that the above embodiments are only used to illustrate the technical solutions of the present disclosure, and not to limit them; although the present disclosure has been described in detail with reference to the foregoing embodiments, those skilled in the art would understand that the technical solutions described in the foregoing embodiments may be modified, or equivalent substitutions may be made for some or all of the technical features thereof; these modifications and substitutions do not make the corresponding technical features depart from the scope of the embodiments of the present disclosure.

What is claimed is:

1. A method for controlling an unmanned vehicle, comprising:
    receiving control messages transmitted by at least two automatic driving physical apparatuses, wherein the control messages comprise indication information and a control signal for performing driving control on the unmanned vehicle;
    determining an optimal control message according to the indication information in each of the control messages; and
    transmitting the optimal control message to a device for controlling the unmanned vehicle, so that the device for controlling the unmanned vehicle performs driving control on the unmanned vehicle according to the control signal in the optimal control message.

2. The method according to claim 1, wherein the indication information is an automatic driving physical apparatus identifier; and
    the determining an optimal control message according to the indication information in each of the control messages comprises:
    determining, according to a pre-stored priority list, an automatic driving physical apparatus identifier having a highest priority, wherein the priority list comprises an automatic driving physical apparatus identifier having a priority order; and
    determining a control message corresponding to the automatic driving physical apparatus identifier having the highest priority as the optimal control message.

3. The method according to claim 1, wherein the indication information is working state information of the automatic driving physical apparatuses; and
    the determining an optimal control message according to the indication information in each of the control messages, comprises:
    determining an automatic driving physical apparatus with a best working state according to the working state information of each of the automatic driving physical apparatuses; and
    determining a control message transmitted by the automatic driving physical apparatus with the best working state as the optimal control message.

4. The method according to claim 1, wherein after determining the optimal control message according to the indication information in each of the control messages, the method further comprises:
    performing a discard process on all the control messages except the optimal control message.

5. The method according to claim 1, wherein when message contents of the control messages are different, after transmitting the optimal control message to the device for controlling an unmanned vehicle, the method further comprises:
    sorting each of the control messages according to the indication information in each of the control messages, to obtain a message list, wherein the message list comprises the control messages sorted by priorities from high to low; and
    transmitting, to the device for controlling an unmanned vehicle, the control messages except the optimal control message in the message list, in order of the priorities from high to low, every preset time period.

6. The method according to claim 1, wherein the receiving control messages transmitted by at least two automatic driving physical apparatuses comprises:
    receiving the control messages transmitted by the at least two automatic driving physical apparatuses within a time window.

7. The method according to claim 1, wherein the transmitting the optimal control message to a device for controlling an unmanned vehicle, so that the device for controlling an unmanned vehicle performs driving control on the unmanned vehicle according to the optimal control message, comprises:
    converting the optimal control message into a control signal; and
    transmitting the control signal to the device for controlling an unmanned vehicle, so that the device for controlling an unmanned vehicle performs driving control on the unmanned vehicle according to the control signal.

8. The method according to claim 1, wherein the device for controlling an unmanned vehicle is any one of the following:
    a chassis control device, a brake device, and an automatic driving control device for the unmanned vehicle.

9. The method according to claim 1, wherein a format of the control messages is any one of the following:
    a hypertext transfer protocol (HTTP) message, a transmission control protocol (TCP) message, an internet protocol (IP) message, an address resolution protocol (ARP) message, a packet internet groper (PING) message, and a controller area network (CAN) message.

10. An apparatus for controlling an unmanned vehicle, comprising: a processor and a computer-readable medium for storing program codes, which, when executed by the processor, cause the processor to:
    receive control messages transmitted by at least two automatic driving physical apparatuses, wherein the control messages comprise indication information and a control signal for performing driving control on the unmanned vehicle;
    determine an optimal control message according to the indication information in each of the control messages; and transmit the optimal control message to a device for controlling the unmanned vehicle, so that the device for controlling the unmanned vehicle performs driving control on the unmanned vehicle according to the control signal in the optimal control message.

11. The apparatus according to claim 10, wherein the indication information is an automatic driving physical apparatus identifier; and
the program codes further cause the processor to:
determine, according to a pre-stored priority list, an automatic driving physical apparatus identifier having a highest priority, wherein the priority list comprises an automatic driving physical apparatus identifier having a priority order; and
determine a control message corresponding to the automatic driving physical apparatus identifier having the highest priority as the optimal control message.

12. The apparatus according to claim 10, wherein the indication information is working state information of the automatic driving physical apparatuses; and
the program codes further cause the processor to:
determine an automatic driving physical apparatus with a best working state according to the working state information of each of the automatic driving physical apparatuses; and
determine a control message transmitted by the automatic driving physical apparatus with the best working state as the optimal control message.

13. The apparatus according to claim 10, wherein the program codes further cause the processor to:
perform a discard process on all the control messages except the optimal control message after the processor determines the optimal control message according to the indication information in each of the control messages.

14. The apparatus according to claim 10, wherein when message contents of the control messages are different, the program codes further cause the processor to:
after the processor transmits the optimal control message to the device for controlling an unmanned vehicle, sort each of the control messages according to the indication information in each of the control messages, to obtain a message list, wherein the message list comprises the control messages sorted by priorities from high to low; and
transmit, to the device for controlling an unmanned vehicle, the control messages except the optimal control message in the message list, in order of the priorities from high to low, every preset time period.

15. The apparatus according to claim 10, wherein the program codes further cause the processor to:
receive the control messages transmitted by the at least two automatic driving physical apparatuses within a time window.

16. The apparatus according to claim 10, wherein the program codes further cause the processor to:
convert the optimal control message into a control signal; and
transmit the control signal to the device for controlling an unmanned vehicle, so that the device for controlling an unmanned vehicle performs driving control on the unmanned vehicle according to the control signal.

17. The apparatus according to claim 10, wherein the device for controlling an unmanned vehicle is any one of the following:
a chassis control device, a brake device, and an automatic driving control device for the unmanned vehicle.

18. The apparatus according to claim 10, wherein a format of the control messages is any one of the following:
a hypertext transfer protocol (HTTP) message, a transmission control protocol (TCP) message, an internet protocol (IP) message, an address resolution protocol (ARP) message, a packet internet groper (PING) message, and a controller area network (CAN) message.

19. A control device, comprising: a transmitter, a receiver, a memory, and a processor, wherein
the memory is configured to store a computer instruction; and the processor is configured to execute the computer instruction stored in the memory to implement the method for controlling an unmanned vehicle according to claim 1.

20. A non-transitory storage medium, comprising: a readable storage medium and a computer instruction, wherein the computer instruction is stored in the readable storage medium; and the computer instruction is configured to implement the method for controlling an unmanned vehicle according to claim 1.

* * * * *